May 8, 1962 J. D. NOBLE ETAL 3,033,382

PLATE-LIFTING DEVICE

Original Filed Feb. 10, 1958 9 Sheets-Sheet 1

INVENTORS
JACK D. NOBLE
GEORGE WAYNE BENTLEY
EDGAR C. RICE
BY
ATTORNEY

INVENTORS
JACK D. NOBLE
GEORGE WAYNE BENTLEY
EDGAR C. RICE
BY [signature]
ATTORNEY

PLATE-LIFTING DEVICE

Original Filed Feb. 10, 1958 9 Sheets-Sheet 3

INVENTORS
JACK D. NOBLE
GEORGE WAYNE BENTLEY
EDGAR C. RICE
BY [signature]
ATTORNEY

PLATE-LIFTING DEVICE

Original Filed Feb. 10, 1958

INVENTORS
JACK D. NOBLE
GEORGE WAYNE BENTLEY
EDGAR C. RICE
BY
ATTORNEY.

INVENTORS
JACK D. NOBLE
GEORGE WAYNE BENTLEY
EDGAR C. RICE
BY [signature]
ATTORNEY May 8, 1962 J. D. NOBLE ETAL 3,033,382

PLATE-LIFTING DEVICE

Original Filed Feb. 10, 1958 9 Sheets-Sheet 6

INVENTORS
JACK D. NOBLE
GEORGE WAYNE BENTLEY
EDGAR C. RICE
BY
ATTORNEY

PLATE-LIFTING DEVICE

Original Filed Feb. 10, 1958

INVENTORS
JACK D. NOBLE
GEORGE WAYNE BENTLEY
EDGAR C. RICE
BY
ATTORNEY.

INVENTORS
JACK D. NOBLE
GEORGE WAYNE BENTLEY
EDGAR C. RICE
BY A. Donham Owen
ATTORNEY.

INVENTOR.
JACK D. NOBLE
GEORGE WAYNE BENTLEY
EDGAR C. RICE
BY
ATTORNEY.

3,033,382
PLATE-LIFTING DEVICE

Jack D. Noble, 3649 Happy Valley Road, Lafayette, Calif.; George W. Bentley, 36 Orchard Road, Orinda, Calif; and Edgar C. Rice, 1435 Edward Court, Lafayette, Calif.

Original application Feb. 10, 1958, Ser. No. 714,121. Divided and this application Dec. 21, 1959, Ser. No. 4,167
24 Claims. (Cl. 212—129)

This invention relates to improvements in plate-lifting devices, especially those of the type employing vacuum or suction cups or electromagnets. It also relates to an improved platelifting attachment for use with overhead cranes. This application is a division of application Serial No. 714,121, filed February 10, 1958.

Many industrial plants have overhead cranes with a bridge that moves along widely spaced runway rails and a trolley that moves back and forth on the bridge carrying a cable hoist for raising and lowering a hook. In some cranes movement of the bridge, trolley, and hoist are controlled from the floor by a control cable suspended from the trolley; in other cranes an operator controls them from a cage, usually located on one end of the bridge. In any event, the hook can be used to lift and transport many things from one part of the factory to another. However, a hook is not able to lift one sheet at a time of steel plate (or other sheet material) and move it without first applying straps, chains, or other tackle to the plate, so that the operation becomes very time-consuming and inefficient. Heretofore specialized equipment, completely separate from the overhead crane, has been required for rapid movement of plates from one part of the factory to another.

The present invention provides a detachable plate-lifting attachment that adapts overhead cranes to rapid plate-lifting and carrying. The use of this attachment greatly increases the versatility of the cranes. Moreover, it is quickly attached and detached; so the crane can still be used as usual when the plate-lifter attachment is taken off.

As implied above, the objects of this invention include the provision of a plate-lifting attachment for overhead cranes.

Another object of the invention is to make it possible for the crane operator, whether at ground level or in a cage, to control the whole plate-lifting apparatus, just as it is already possible for him to control the overhead crane.

Safety has been a serious problem in plate-handling equipment. Many things can occur to break a vacuum or de-energize an electromagnet, and heretofore that has generally meant that the plate dropped, falling to the floor and damaging it or striking whatever or whoever was between it and the floor. Safe operation is another object of this invention, and this object is achieved by several novel features of the combination. For example, the suction cups are preferably linked in series, and all of them must contact the plate and vacuum develop between them and the plate before the plate can be lifted.

Another very significant safety feature of the invention is the provision of a special mechanical plate-support means which engages each plate after it has been lifted a predetermined distance and from then on prevents the plate from falling, even though the vacuum in the suction cups (or electric circuit to the electromagnets) be broken.

An important related object is to engage the mechanical safety supports with the plates after the plates have been lifted a predetermined distance, no matter whether they are lifted from the top of a tall stack or from the floor. Moreover, the engagement is made without having to readjust the engaging apparatus to the stack height or plate level. Achievement of this object makes it possible to operate safely throughout the unstacking of a tall stack of steel plates, even where the plates are stacked close to other stacks or to machinery, without having to make any readjustment during operation.

Another object of the invention is to provide a fail-safe safety support for the steel plates which does not interfere with proper release of the suction cup or electromagnetic arrangement.

Other objects and advantages of the invention will appear from the following description of some preferred forms thereof.

*A Typical Overhead Crane Described*

Figures 1, 2:
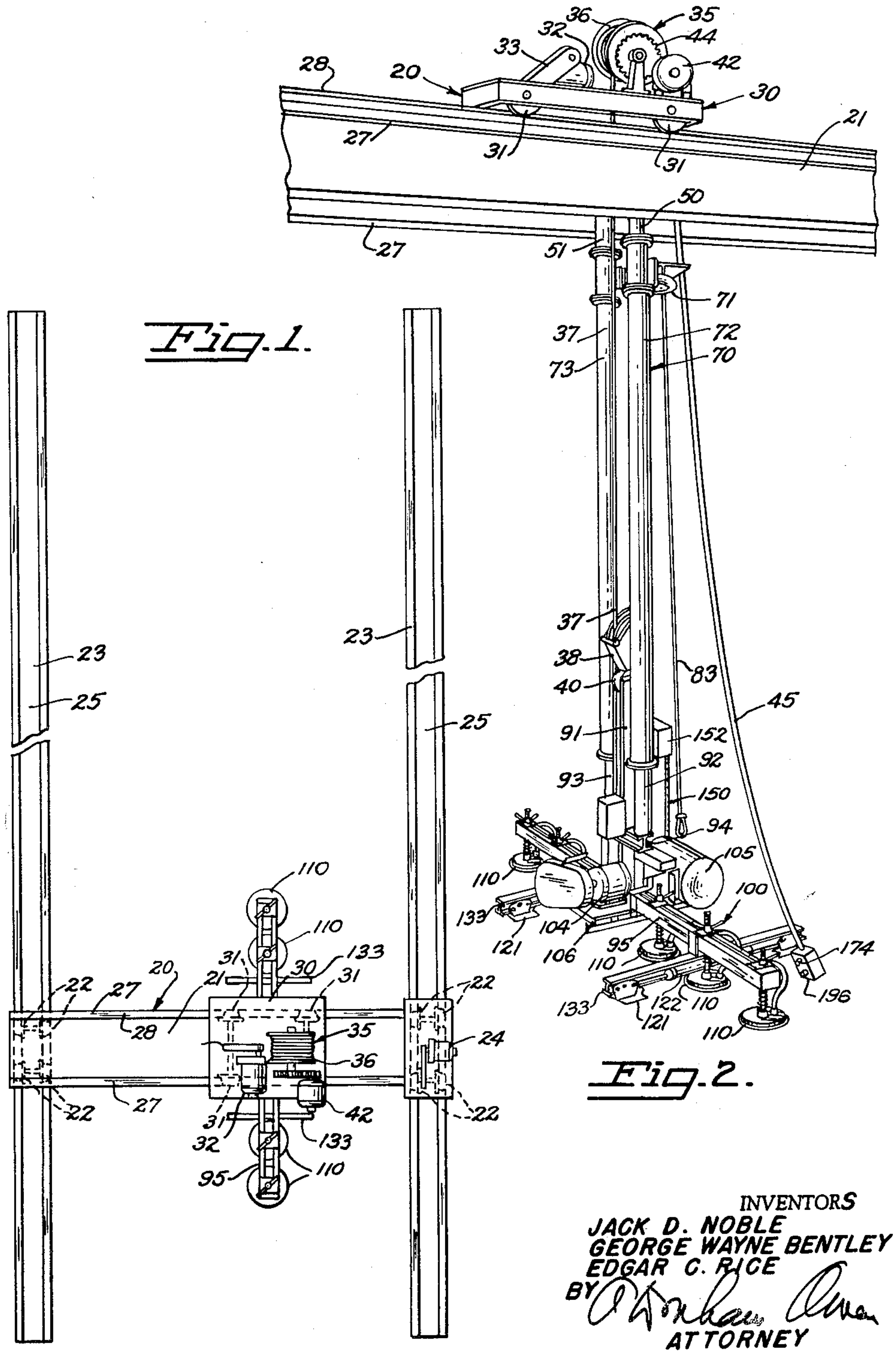
FIG. 1 is a top plan view of an overhead crane system incorporating a plate-lifting attachment embodying the principles of the present invention.
FIG. 2 is a perspective view of a portion of the crane of FIG. 1 showing the trolley and hoist supporting the attachment.

While overhead cranes are well known in the art, FIGS. 1–4 disclose the basic structure of a typical such crane 20. A bridge 21 is mounted on wheels 22 for movement along a pair of widely spaced-apart runways 23, when driven by a power device 24. The runways 23 typically rest directly on or form part of structural beams 25 located high above the floor 26 of the building. The bridge 21 itself comprises a pair of structural beams 27, joined adjacent their ends only and supporting a pair of rails 28 on their upper surfaces.

A trolley 30 has flanged wheels 31 that run back and forth on the rails 28, powered by an electric motor 32, and chain drive 33. The trolley 30 supports a hoist 35 comprising a drum 36, cable 37, block 38, and cable-end anchor 39. The block 38 supports a hook 40, preferably by a pivot pin 41, for engaging and carrying a load. A reversible motor 42 on the trolley 30 rotates the drum 36 through reduction gears 43 and 44. By moving the trolley 30 on the bridge 21 and the bridge 21 on the runways 23, any point in the area between the runways 23 can be reached, and the hoist 35 makes it possible to reach any height between the runways 23 and the floor 26 (or even lower, if there are openings in the floor 26). Control may be obtained at floor level by a control cable 45 depending from the trolley 30 or by a control board in an operator's cage (not shown), usually loacted at one end of the bridge 21 but sometimes on or adjacent the trolley 30.

*The Stabilizer and Its Attachment (FIGS. 2–5)*

The present invention makes it possible to adapt this conventional overhead crane 20 to important new uses of which it formerly was incapable. To begin with, one or more downwardly extending vertical structural members are rigidly secured to the trolley 30. Preferably, two such members 50 and 51 are secured by welding a pair of angle irons 52 to the bottom of the trolley 30 and welding a pair of channel irons 53 across the angle irons 52 (sec FIG. 5). The upper portion of each member 50 and 51 may comprise a cylindrical pipe 54 welded to one channel iron 53 and further supported by a pair of braces 55 that are welded both to the pipe 54 and to the channel iron 53.

To the lower end of the pipe 54 is secured a bayonet-type coupler 56. Each coupler 56 has a lower cylindrical portion 59 (on the member 50), or 60 (on the member 51) and a tapered lower end 61. Preferably, as shown, the lower cylindrical portion 59 of the member 50 is somewhat longer than the corresponding portion 60 of the other member 51 for a reason which will appear presently.

Figures 4, 5:
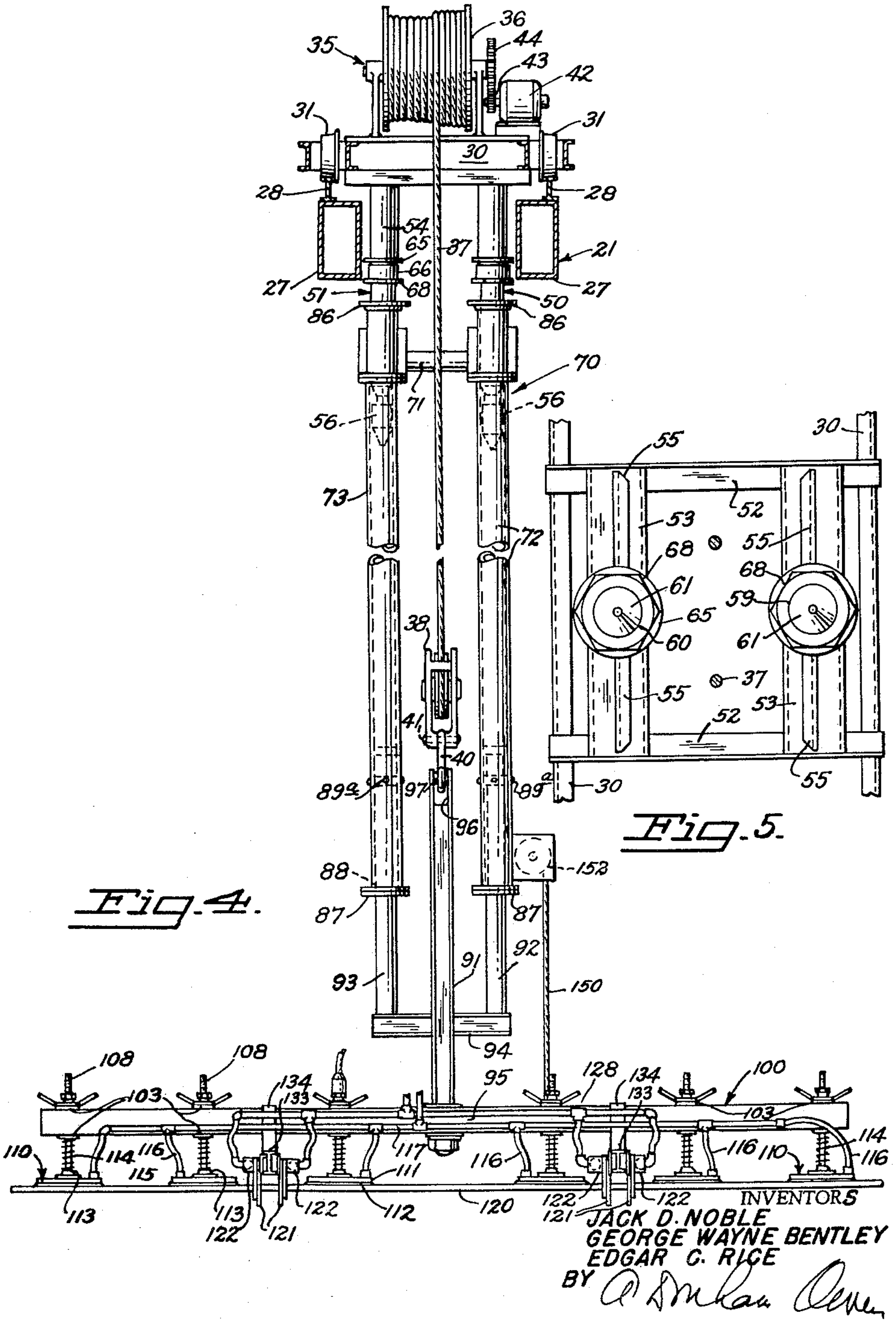
FIG. 4 is a view in front elevation of the assembly of FIG. 3 with the motor compressor, suction pump, and some other parts being removed from a vacuum-type plate-handler that in this instance comprises the bottom portion of the apparatus, in order to show other parts more clearly. The bridge and the trolley rails are shown in section, and the cables and stabilizer are broken as before.
FIG. 5 is a bottom plan view of a portion of the trolley showing the attachment thereto of the vertical supporting members.

The bayonet couplers 56 may be welded directly to the lower ends of the pipes 54, but a preferable juncture is provided by the structure shown in FIGS. 4 and 5. A flange 65 is welded to the lower end of the pipe 54, and an interiorly threaded coupler sleeve 66 is welded to the flange 65. The upper end of the shank 57 is threaded to a screw inside the sleeve 66, and a hexagonal lock nut 68 is also threaded on the upper end against the sleeve 66. This makes the couplers 56 removable by taking off the locknuts 68 and then unthreading them from their sleeves 66. In any event, the cable 37 hangs midway between the two vertical members 50 and 51. The members 50 and 51 being relatively short, do not ordinarily interfere with the normal operation of the crane 20, and if they are too long, the couplers 56 can be removed, leaving the pipes 54 the only portion permanently installed on the trolley 30. All the rest of the attachment is readily removable or attachable.

The present invention employs the two vertical members 50 and 51 as the supports for an upper stabilizing assembly 70. As shown in FIGS. 2–4 and 5, a horizontal U-shaped frame 71 joins two long vertical guide or extension tubes 72 and 73 adjacent their upper ends. A convenient distance above and near the U-shaped frame 71, the tubes 72 and 73 are provided with slotted openings through which a movable locking dog or latch 75 extends. The latch 75 has a stem 80, urged to a normally closed radially inner position. A cord 83 passes over pulleys 84; one cord 83 is joined to the other cord 83, one or both of which pass thence to the lower end of the device (or other control point) so that the coupling and uncoupling can be manipulated from below or from another control point.

When the tube 72 is aligned with the longer bayonet coupler 50 and the tapered end 61 is inserted part way into the tube 72, the frame 71 may be rotated sideways until the second coupler 51 is also properly aligned and its tapered end 61 inserted into the tube 73. The tapered, conical lower ends 61 force the latch 75 outwardly, but when the recesses 58 are reached, the latches 75 snap in and lock just above the lower cylindrical portions 59 and 60. Upper flanges 86 on the tubes 72 and 73 provide a guide to the operator in this coupling operation and also provide a definite stop by engaging the lock nuts 68.

There are also lower flanges 87 on the lower ends of the tubes 72 and 73, and these help hold lower sleeve bearings 88 in place. Upper sleeve bearings may be secured in place a few feet above the lower bearings 88, as by set screws 89ᵃ.

*The Lower Frame 90 and Its Connection to the Crane and Stabilizer*

The entire auxiliary lifting attachment is supported by a frame 90 which, in the structure that will first be discussed, has three upwardly extending, in-line vertical standards 91, 92, and 93. The standards 92 and 93 may extend up from an upper horizontal frame member 94 that is supported by the central standard 91. The standard 91 is connected to a lower horizontal frame member or base frame 95. (See FIG. 4.) The upper end of the central standard 91 is provided with an eye 96 and a bar 97 which is grasped by the hook 40 and constitutes the sole support for the load carried by the frame 90.

The standards 92 and 93 extend a substantial distance above the standard 91 and preferably constitute cylindrical pipes. They move up and down in the tubes 72 and 73, contacting only the sleeve bearings 88 and 89. Preferably, there is no cap preventing retraction of the standards 92 and 93 from the tubes 72 and 73 because that is not necessary, and sometimes disassembly may be desirable. In normal use they are never moved far enough in opposite directions to come apart. They serve only a guiding and stabilizing function and do no lifting. When the hook 40 is disengaged from the bar 97, the cord 83 is also pulled, and the stabilizer 70 is detached from the members 50 and 51, staying with the frame 90 both when used and when not used. During assembly, the sole lifting and support of the attachment is through a bar 97, hook 40, and cable 37, which are always made capable of lifting much heavier objects than the attachment of this invention, even when it is loaded with steel plate. The hoist 35 determines the height of the base frame 95 above ground level and carries everything, while stability and protection from rotational movement is provided by the guide tubes 72, 73 and the tubes 92, 93. Lifting is then truly vertical, and the crane trolley 30 accomplishes all the lateral and lengthwise movement from one part of the factory to another.

*The Vacuum Lift Device 100 (FIGS. 2, 3, 4 and 6)*

Figures 3, 13:
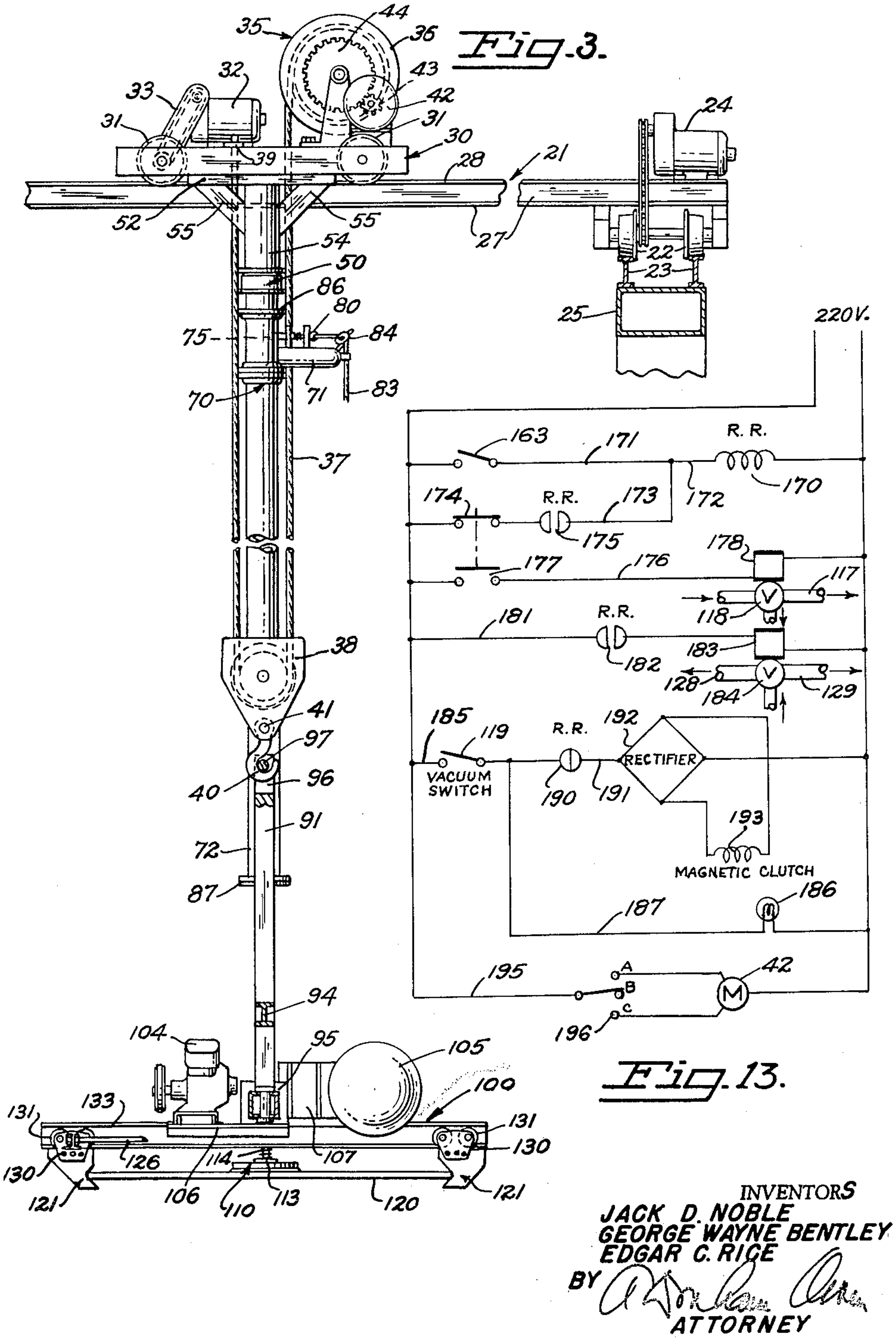
FIG. 3 is a view in side elevation of a trolley and a portion of the bridge of the overhead crane of FIG. 1. The middle portion of the hoist cable and of the stabilizer and the ends of the bridge are broken in order to conserve space.
FIG. 13 is a straight-line diagram of the circuit for actuating and releasing the safety grapple.

The lower horizontal frame member or base frame 95 may support a vacuum lift device 100, electromagnetic lift device 220 (FIG. 16), or other type of lift device, preferably of the contact type. (Contact lift means includes both suction cups and electromagnets.) The base frame 95 preferably comprises a pair of channels 101 and 102 (FIG. 6) arranged on their sides facing each other and a series of brackets 103 holding them together in spaced-apart relation (see FIG. 4). As shown in FIGS. 2 and 3, the frame 95 preferably supports a motor compressor 104 and a compressed air tank 105, preferably by means of extension platform 106 and supporting bracket 107. Through some of the brackets 103 there are holes that receive and guide the vertical movement of stem members 108, at the lower end of which are vacuum cup assemblies 110 or electromagnets 221. The vacuum lift device will be discussed first.

The suction cup assemblies 110 may be substantially as shown in application Serial No. 635,172 filed January 22, 1957. Each suction cup assembly 110 includes at its lower end a flat steel disc 111 with an annular rubber cup member 112 extending down from around its outer periphery. Each steel disc 111 may be secured to a universal joint 113, which, in turn, is connected to a stem 108. The vacuum cup assemblies 110 are mounted with a spring 114 bearing between the disc 111 and a bracket 103 on the lower side of the frame 95. This makes it possible for the cup 110 to engage a plate 120 to be lifted and to come into sealing contact with it and then for the frame 95 to move down further relatively to the suction cup 110 without depressing the suction cup 110 to any great extent but merely compressing the spring 114. This spring mounting in connection with the universal joint 113 assures engagement of the cup 110 with the plate 120, even if the plate 120 should be bent or otherwise not perfectly flat, and it does allow for an uncritical amount of movement between the lifting frame 95 and the suction cups 110 without any harm to the device.

Into the disc 111 is threaded a lower fitting $115^a$. A flexible conduit 116 leads from the fitting $115^a$ up to a valve 115 connected to main transverse conduit 117, the flexible conduit 116 permitting relative movement between the main conduit 117 and the valve fitting $115^a$ when the spring 114 is compressed. The valve 115 may be preset to a desired suction value or can be closed off when fewer cups 110 are to be used, so that suction will be exerted only in the ones used. For the sake of adaptability, etc., the valve 115 may be manually operable for individually closing off the conduit 116 and for regulating the pressure at this point to any desired amount. The valve 115 is connected so that, when open, it is either a vacuum line or a pressure line. Vacuum is obtained by connecting the valve across the compressor 104 so that it is pumping from the fitting $115^a$, while the pressure is obtained by connecting it across the output side of the compressor 104 so that it is pumping air to the fitting $115^a$. Control is obtained by a valve 118 shown in FIG. 13.

A vacuum switch 119 is also provided in the line 117. The switch 119, which may be a well-known type of mercury switch or any other suitable vacuum-operated switch, does not close until a predetermined vacuum is obtained in the line. Until such vacuum is obtained, and the switch 119 is closed, the lifting apparatus cannot be operated. Further explanation of this feature appears in the discussion of the circuit diagram of FIG. 13.

So far as the vacuum lift arrangement 100 is concerned, the operator moves the crane trolley 30 in the normal way and uses the hoist 35 to cause the suction cups 110 to drop down on top of a plate 120. Normally the pump 104 is kept going all the time, and when the cups 110 make contact with the plate 120, a vacuum begins to build up in the line 117. When the pump 104 is able to achieve the predetermined degree of vacuum, the vacuum switch 119 is thrown. Then by pressing a conventional control button for the hoist 35, the operator can cause the plate 120 to be lifted.

*The Mechanical Safety for Plate Support* (*FIGS. 6–9*)

The vacuum-cup arrangement is sufficient to lift and carry the plates 120 from one place to another, and they provide the main lift. However, it has been found by experience that vacuum-lift systems are not foolproof, and safety precautions must be taken or else the operation of moving heavy plate will be dangerous. For that reason, the present invention provides a plurality of pairs of mechanical safety hooks or grapplers 121.

Figures 6, 7:
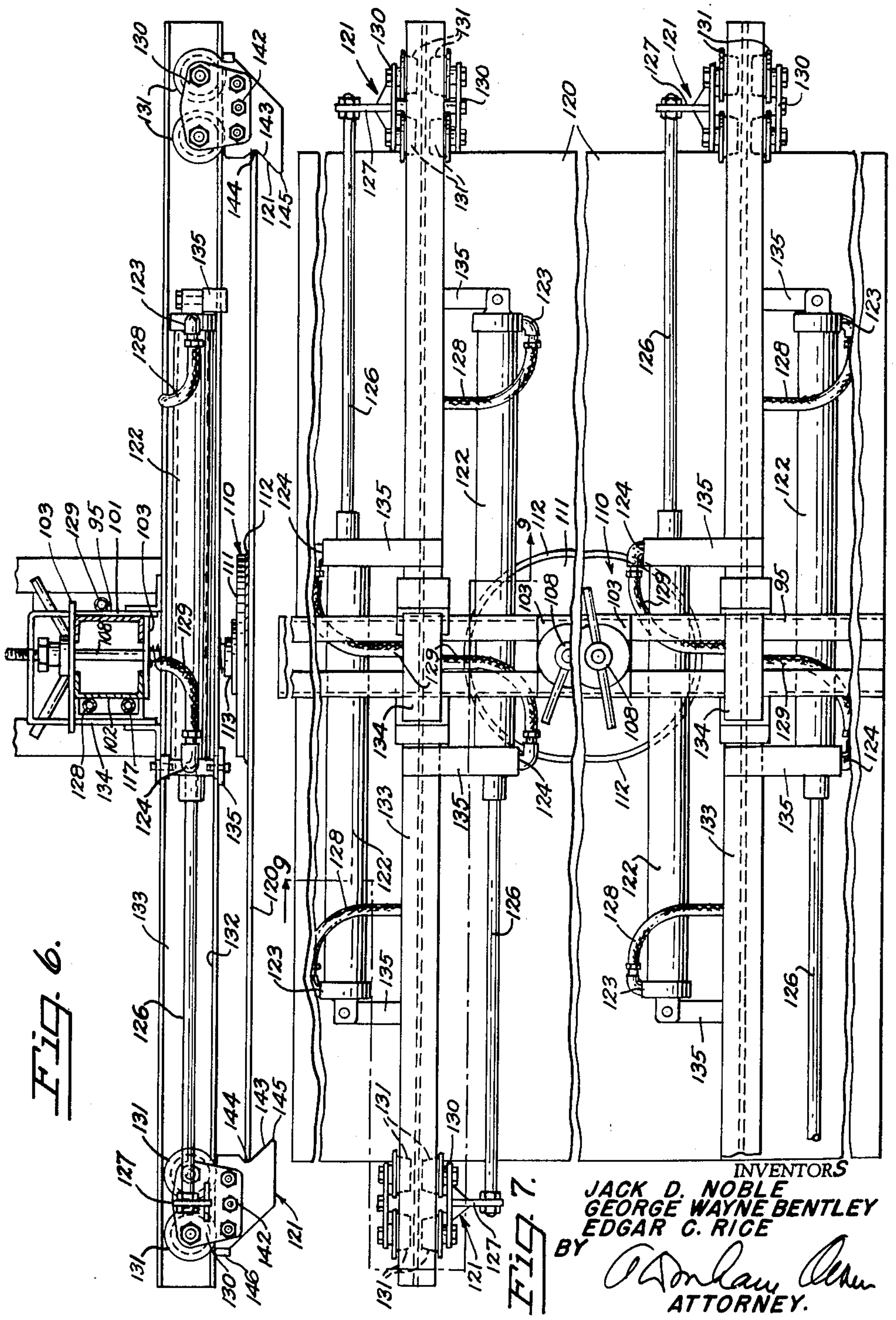
FIG. 6 is a view in end elevation on an enlarged scale, with respect to FIGS. 3 and 4, of the lower portion of the apparatus, showing safety grapplers engaging a plate which has been lifted up by the suction cups. The view is broken off at the top in order to conserve space, and the compressor, pump, and other similar parts have been omitted for the sake of clarity.
FIG. 7 is a fragmentary top plan view of the plate-lifting attachment of FIG. 6, with some portions broken in order to conserve space and with other portions omitted to make the view clearer.
Figure 8:
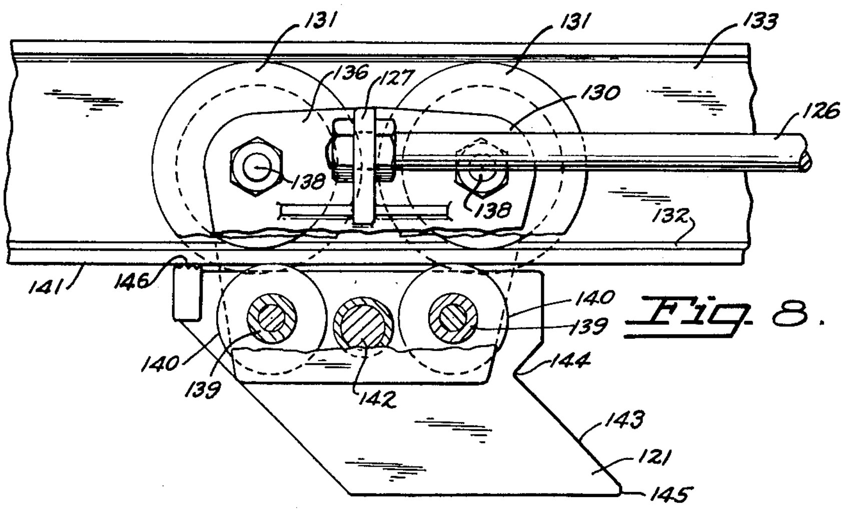
FIG. 8 is a further enlarged fragmentary view in side elevation and partly in section of a portion of one safety grappler and some associated parts.
Figure 9:
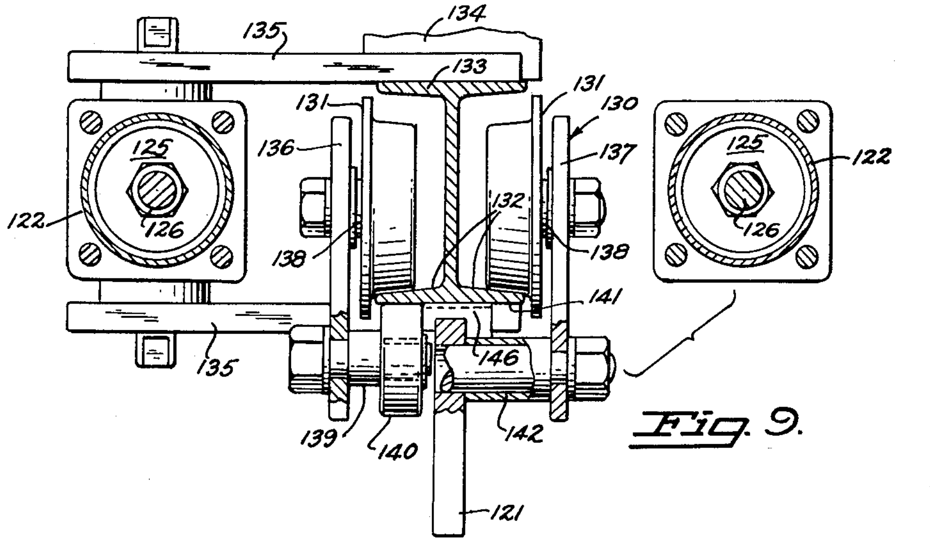
FIG. 9 is an enlarged fragmentary view in vertical section taken along the line 9—9 in FIG. 7 with some parts broken away and shown in section.

The grapplers 121 are pneumatically operated in pairs, as shown in FIGS. 6 and 7. An air cylinder 122 is supported transversely across the frame 95 for each grappler 121, and has ports 123 and 124 at opposite ends for pumping air into either end of the cylinder 122. A piston 125 moves in each cylinder 122 at the end of an elongated rod 126. A transverse member 127 connects the outer end of the rod 126 to a small trolley truck 130 (see FIGS. 8 and 9 especially). Conduits 128 and 129 connect the ports 123 and 124 respectively to the compressor 104, according to the position of a solenoid valve 184, discussed later.

The truck 130 has wheels 131 mounted thereon for movement along rails 132 provided by an I-beam 133. The I-beam 133 is supported below and transverse to the frame 95 by a bracket 134 (FIGS. 6 and 7), and each I-beam 133 supports two trucks 130, one on each side of the frame 95. Extension brackets 135 on each I-beam 133 support the two cylinders 122 for that pair of trucks 130.

Each truck 130 (FIGS. 7 and 8) comprises a pair of plates 136 and 137 supported by stub axles 138 for the wheels 131. Each plate 136, 137 carries a pair of stub shafts 139 for lower rollers 140, whose upper surface rides on the lower surface 141 of the I-beam 133, thereby assuring stability of the truck 130 as it rolls along the I-beam. A center bolt 142 extends between the plates 136 and 137 and pivotally supports the hook or grappler 121 along its gravity axis. The grappler 121 may be shaped as shown to provide a sloping tooth 143 and notch 144 of reverse slope. The point 145 of the tooth 143 is nearest the frame 95. At its outermost upper end the grappler 121 has a knurled heel 146 which digs into the I-beam surface 141 when downward pressure is exerted on the tooth 143.

It will be evident from the foregoing that when air enters the inner port 123 of the pneumatic cylinder 122, the piston 125 and rod 126 are moved outwardly, and the grapplers 121 are carried out by the trucks 130 until they lie outside the boundaries which could be assumed by the plate 120. Then, by feeding air into the outer ports 124 after a plate 120 has been lifted by the vacuum cups 110 (and the delay mechanism will be explained later), the grapplers 121 may be moved in and brought into engagement with the plate 120, which is still supported by the suction cups 110.

The grapplers 121 work in pairs on opposite sides of the plate 120, and each one is moved in by its pneumatic cylinder 122 until it engages the plate 120, where it is held, for the pneumatic force is not so strong as to flex or bend stiff plate. When the grapple is brought into engagement, it necessarily prevents the plate 120 from dropping, for the air pressure in the cylinders 122 tends to force it inwardly against the plate 120. Even if this pneumatic force should fail, and the plate 120 were to start dropping, its weight on the teeth 143 would swing the grapplers 121 on their pivots 142, and the knurled heel 146 would then engage and dig into the I-beam 133 and prevent further outward movement. Since the distance between the inner ends 45 of each pair of grapplers 121 is smaller than the width of the plate 120 or the distance between the notches 144, the plate 120 cannot possibly fall through between the grapplers 121.

As shown in FIG. 6, the brackets 134 provide a lost-motion connection between the frame 95 and the I-beam 133; if the safety grapple should touch the floor, the frame 95 and suction cups 110 can continue to move down, or if the safety grapple should strike another stack of plates, the suction cups 110 can continue to move down.

The pneumatic system for the safety grapple has been fully described, but there is no intention to exclude from this invention other power means for moving the grapples in and out, especially means (like the described pneumatic system) where each grapple stops independently when it engages the plate.

*Actuation of the Safety Grapple: the Mechanical Features (FIGS. 10 to 12)*

The suction cups 110 are intended to lift the plates 120 a predetermined distance before the safety grapple is actuated to move in and engage the plates. A cable 150 has one end 151 secured to the base frame 95 while the other end is wound around a free-running drum 152 mounted on one tube 72, so that it does not move up and down when the frame 95 is raised and lowered. The drum 152 carries a spring 153 so that when the frame 95 is lowered the cable 150 unwinds and winds the spring 153 tighter, and when the frame 95 is raised, the spring 153 acts to turn the drum 152 and wind up the cable 150 as slack becomes available. A shaft 154 secured to the center of the drum 152 supports one disc 155 of a magnetic clutch 156, the other disc 157 of the magnetic clutch 156 being mounted on a second shaft 158 for rotation therewith. This magnetic clutch 156 is actuated by electric current to lock the discs 155 and 157, and then the two shafts 154 and 158 turn together; when the clutch 156 is de-energized, the shaft 158 is unaffected by the turning of the shaft 154.

The driven shaft 158 is provided with a cam 160 (FIG. 12) comprising a mostly circular ring with a substantially flat portion 161. A cam follower 162 mounted adjacent the cam 160 is connected to and forms the actuation lever for an electric switch 163. The switch 163 is closed when the follower 162 engages the flat portion 161 of the cam 160. The shaft 158 is provided with a torsion spring 164 which restores it to its original position when the magnetic clutch 156 is disengaged, so that upon the energization of the clutch 156 the cam 160 is always in the same position relative to the switch 163, as it always has to turn the same distance in order to actuate that switch.

Of course, this system is not limited to cable operation. It can be used with a rack and pinion system or other systems.

*Actuation of the Safety Grapple: the Electrical Circuit (FIG. 13)*

Looking at the straight-line circuit diagram of FIG. 13, it will be seen that the mechanically operated switch 163 is in series with a ram relay (RR) 170 through lines 171 and 172. In line 173 a normally closed push-button switch 174 is in series with the ram relay (RR) contacts 175, and the line 173 is in series with the line 172 and the relay 170 and in parallel with the line 171, so that the relay 170 is self-holding when energized.

In line 176 a normally open push-button switch 177 (physically linked to move with the switch 174) is in series with a solenoid 178 controlling the valve 118. The valve 118 is normally (i.e., when the switch 177 is open) in a position where it tends to place a vacuum on the cups 110 by pumping air from them to the pump 104. When the switch 177 is closed, the solenoid 178 moves the valve 118 to send air under pressure from the pump 104 into the cups 110. The line 181 similarly places in series normally open ram relay (RR) contacts 182 and a solenoid 183. The solenoid 183 controls a valve 184 which connects a pressure line between the compressor 104 and the cylinders 122. When the solenoid 182 is de-energized, the valve 184 sends air under pressure into the ports 123 of the cylinders 122 and spreads the grapplers 121 apart. When the solenoid 183 is energized, the valve 184 is moved to send air under pressure into the ports 124 and move the grapplers 121 toward each other.

In the line 185 is the vacuum responsive switch 119 which is closed when a predetermined degree of vacuum is reached in the line 117 to the suction cups 110. This vacuum switch 119 is in series with an indicating light 186 in line 187 which shows the operator when the switch 119 has been closed as a result of the desired vacuum having been attained. The switch 119 is also in series with normally closed ram relay (RR) contacts 190 in line 191 which, in turn, is in series with a rectifier 192 connected to a coil 193 for the magnetic clutch 156. Line 195 has a manual switch 196 with three positions for starting (A), stopping (B), and reversing (C) the lifting motor 42 running the hoist 35.

*Operation of the Lifting Device 100 and Its Safety Features and Circuit*

By moving the switch 196 to its C position, the motor 42 is operated to cause the hoist 35 to lower the cable 37 and the hook 40 and therefore to lower the frame 95 with its suction cups 110. During this lowering the cable 150 unwinds from the reel 152, increasing pressure on the rewind spring 153. The clutch 156 is de-energized; so the shaft 158 does not turn. Lowering is continued until the cups 110 engage the plate 120 and until the springs 114 are somewhat compressed. If the grapplers 121 touch the floor, the lost-motion connection provided by the bracket 134 permits additional movement of the cups 110. The compressor 104 is being operated to suck in air through the cups 110, because the solenoid 178 is de-energized. The cups 110 engage the plate 120 and are evacuated. When the proper pressure level is reached, the switch 119 is closed.

Closure of the vacuum switch 119 energizes the coil 193 for the magnetic clutch 156, and lights the light 186; so the operator knows that it is safe to lift the plate 120. He then moves the switch 196 to its A position where the motor 42 winds the hoist 35 and lifts the hook 40, and the vacuum cups 110 lift the plate 20. Meanwhile, the spring 153 rewinds the cable 150 as fast as it slackens, and the energized magnetic clutch 166 causes the shaft 158 to turn with the reel shaft 154, rotating the cam 160. When the cable 150 has reeled in a predetermined amount, the shaft 158 has turned a predetermined amount. In other words, height is the controlling factor, for the height of lift, through the magnetic clutch 156, governs the turning of the cam 160. The cam 160 is set so that at a particular height of lift, which may be three inches, six inches, one foot, or any desired amount, the flat portion 161 actuates the switch 163.

Closure of the switch 163 by the cam 160 energizes the ram relay 170, closing the normally open contacts 175 and 182 and opening the normally closed contacts 190. Thus, the magnetic clutch 156 is instantly disengaged, since its coil 193 is in an open circuit. The ram relay 170 is held open by the self-holding contacts 175, and closure of the contacts 182 operates to move the valve 184 for the pneumatic circuit controlling the grapplers 121, sending air under pressure to the ports 124 of the cylinders 122, so that the grapplers 121 will be moved toward each other and serve their safety function. When each grappler 121 engages the plate 120, it stops moving. Upon disengagement of the clutch 156, the spring 164 pulls the cam 160 back to its initial position and opens the switch 163. The plate 120 may then be lifted higher and carried by the trolley 30 to the desired point. During lifting and lowering, the cable 37 is the sole lifting member, but the tubes 72, 73 and 92, 93 guide and stabilize, preventing sway or rotation, the tubes 92 and 93 moving up in the tubes 72, 73 as the hoist 35 raises the hook 40 and moving down as the hook 40 is lowered.

When it is desired to release the plate 120, the operator manually presses the release button 174. This de-energizes and opens the self-holding contacts 175 so that the relay 170 is de-energized. The contacts 182 are opened by de-energization of the relay 170; so the grapplers 121 are moved apart from each other by the reversal of the valve 184, sending air into the ports 123. At the same time the release switch 177 closes the circuit in the line 176, moving the valve 118 to send air under pressure into the lines 117 and cups 110, breaking the vacuum, and dropping the plate 120 from the cups 110. Simultaneously, the ram relay contacts 190 are again closed, but since the vacuum switch 119 is open, the magnetic clutch 193 is not actually energized and the light 186 is not lighted. The switch 174, 177 may be released as soon as the plate 120 drops, ending the cycle. The crane 20 may then be operated to lift another plate, by repeating the cycle.

*Operation of Installing or Detaching Plate-Lifting Attachment*

The vertical structural members 50 and 51 are secured permanently in place on the bottom of the trolley 30, but all the remainder of the attachment is put on when needed and taken off when the crane 20 is to be used otherwise. The attachment is kept and stored as a unit, including the vacuum lift device 100, the attachment frame 90, and the stabilizer 70. When the device is to be used, the trolley 30 is moved to a position vertically above the stored attachment, and the hook 40 is lowered to reach into the eye 96 and is then raised to engage the bar 97. The hoist 35 is then operated to raise the hook 40, carrying with it the frame 90 and the stabilizer 70. At this time the stabilizer 70 usually rests with its lower flanges 87 on the horizontal frame member 94. The assembly is lifted until the upper end of the stabilizer tube 72 approaches the tapered lower end 61 of the vertical member 50 and then is lifted slowly and carefully so as to guide the lower end 61 into the tube 72. When this has been done, the hook 40 is raised a few inches further until the lower end 61 of the member 51 is just above the other tube 73. The members 73 and 51 are aligned, and then the hoist 35 is again operated to raise the stabilizer 70. As it goes up, the latches 75 in the tubes 72 and 73 ride up the conical face of the lower end 61 and over the cylindrical faces of the members 59 and 60 until they reach the recess 58. At that point the spring 78 pushes the latches 75 inwardly to lock them above the shoulder 63. From now on the operation of lowering the hook 40 will lower the standard 91 relative to the stabilizer 70, while the standards 92 and 93 slide up and down in the tubes 72 and 73 to guide the standard 91 and to prevent relative rotation between the trolley 30 and the vacuum lift device 100.

When it is desired to remove the attachment, the operator preferably raises the hook 40 until the flanges 87 rest on the cross member 94 and then carefully lowers the hook 40 while pulling on the cords 83 to retract the latches 75. The stabilizer 70 can thus be uncoupled from the vertical members 50 and 51. Then he lowers the hook 40 until the lower end of the attachment rests on the factory floor, preferably adjacent a suitable supporting structural member against which the device can be leaned. However, if desired, it can be laid out on the floor. He then uncouples the hook 40 from the member 97 and is free to use the crane for its normal uses.

*The Actuation of the Safety Grapple By An Alternative Method (FIGS. 14 and 15)*

Figure 10:
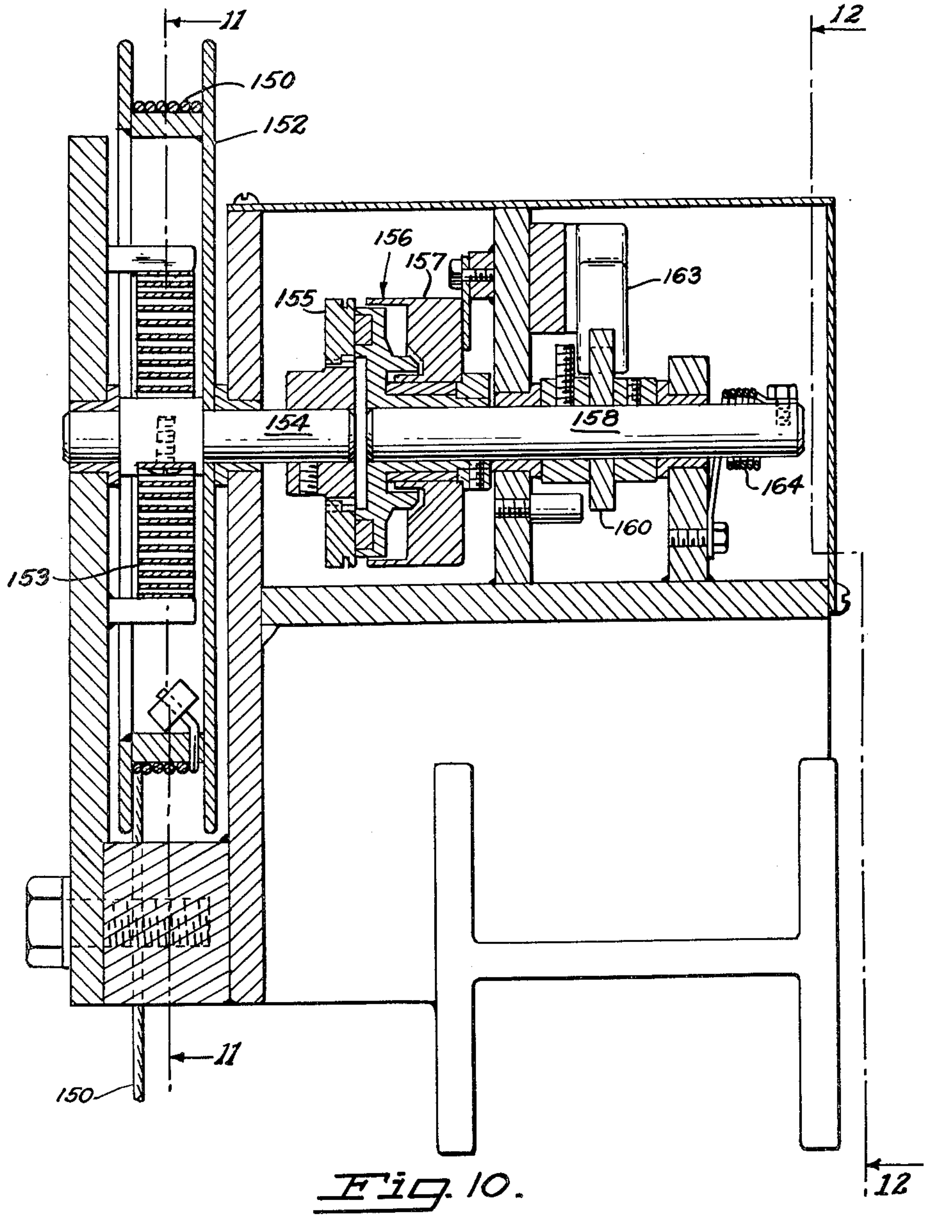
FIG. 10 is a view on an enlarged scale of a reel, magnetic clutch, and cam-operated switch arrangement which acts in cooperation with an electrical circuit to provide engagement of a vacuum-lifted plate by the safety grapple after a predetermined amount of upward travel of the plate.
Figure 11:
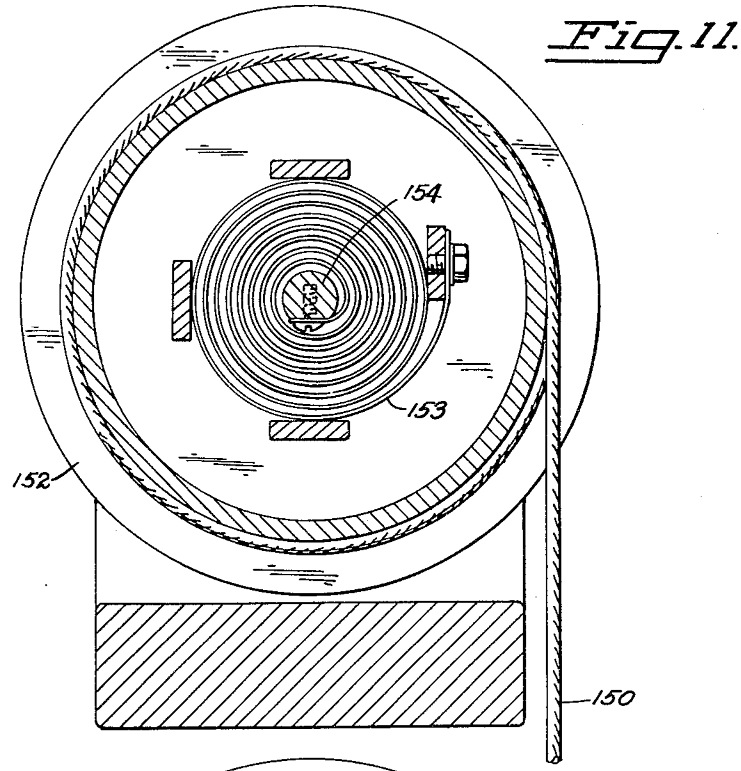
FIG. 11 is a view in section taken along the line 11—11 in FIG. 10, showing the spring-mounted cable reel.
Figure 12:
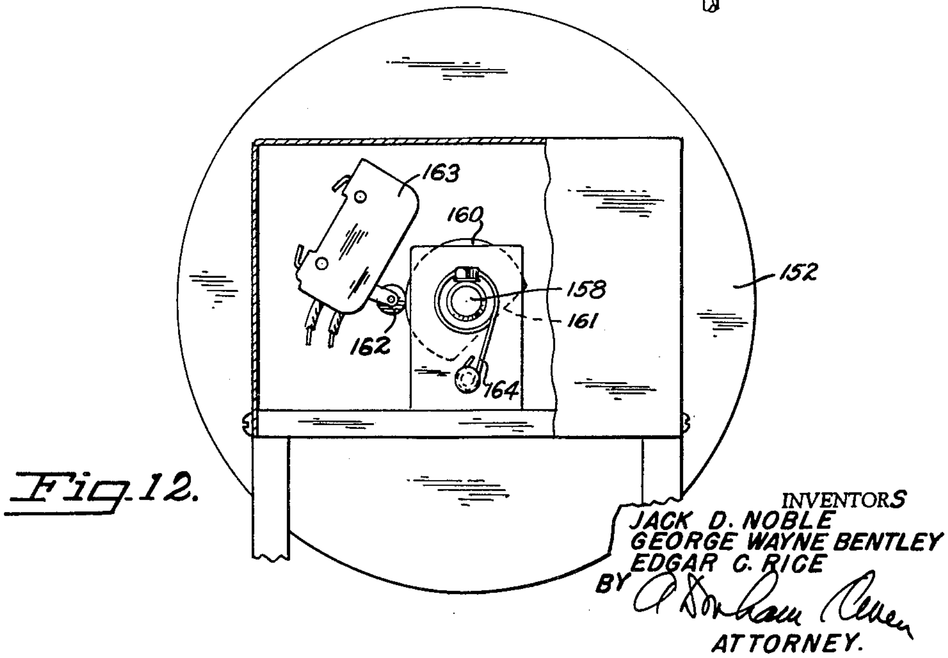
FIG. 12 is a view in end elevation taken along the line 12—12 in FIG. 10 and showing the cam-operated switch for the safety grapple.
Figures 14, 15:
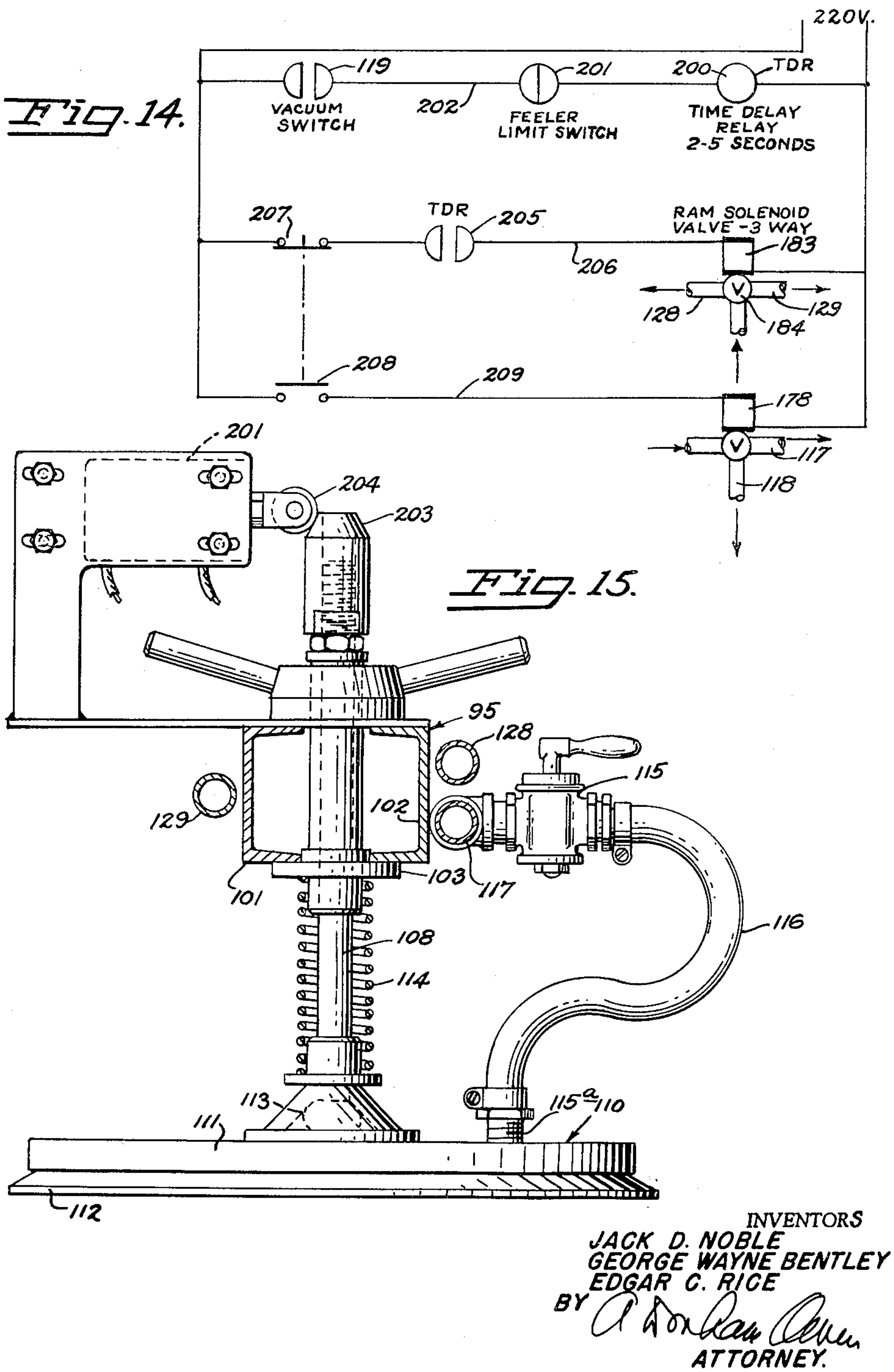
FIG. 14 is a straight-line diagram of a modified form of circuit employing a timer arrangement for actuating the safety grapple.
FIG. 15 is a simplified view in elevation of a timer-actuated feeler-limit switch on a suction cup stem.

In place of the circuit of FIG. 13 and the cable, drum, and magnetic clutch system of FIGS. 10 through 12, the hooks 121 may be actuated by a timer device as shown in FIG. 15 and by the circuit of FIG. 14. In this instance a time delay relay (TDR) 200 is placed in series with the vacuum switch 119 and a feeler limit switch 201 in a line 202. The vacuum switch 119 is normally open, being closed only when the vacuum is developed in the suction cups 110. The feeler limit switch 201 is mounted on the frame 95 and is normally closed but is opened by a cam 203 on top of the vacuum cup stem 108 at the time the spring 114 is compressed. As a result, when the apparatus 100 is being lowered, the feeler limit switch 201 is closed, the vacuum switch 119 is opened, and the time delay relay 200 de-energized.

When the cups 110 engage the plate 120 and depress the springs 114, the feeler limit switch 201 is opened by the cam 203 engaging a cam followed and switch lever 204. Thus, when the vacuum switch 119 closes, the time delay relay 200 is still not energized until the operator actuates the lift switch 196 in the circuit of FIG. 13. When he has done so, the device starts to lift, and the cam 203 drops down as the weight of the plate 120 pulls on the spring 114 to disengage the cam follower and switch lever 204. The switch 201 returns to its normally closed position. Then, since both the vacuum switch 119 and limit switch 201 are closed, the time delay relay 200 is energized.

After a few seconds' delay, which may be set as desired, the time delay relay 200 closes normally open (TDR) contacts 205 in line 206, where it is in series with a normally closed push-button switch 207 and the solenoid 183 which controls the valve 184, as previously described, to send air into the ports 124 and move the safety grapplers 121 to their engaged position. Thus, time is given to lift the plate 120 far enough to clear the other plates in the stack. The circuit remains in this position until the time of release.

To release the plates, the operator presses the push-button switch 207 to its open position, which de-energizes the solenoid 183 and sends air from the valve 184 into the ports 123 to retract the safety grapplers 121. The push-button switch 207 is also linked mechanically to a normally push-button switch 208 in line 209, where it is in series with the solenoid 178 controlling the valve 118. Thus, the valve 118 reverses to send air into the cups 110, causing the plate 120 to drop and consequently opening the vacuum switch 119. Opening the switch 119 de-energizes the relay 200 and its contacts 205, so that the circuit remains as shown in FIG. 14 until the next cycle is begun.

*An Electromagnetic Type of Lifting Device 220 (FIGS. 16 and 17)*

As stated earlier, this invention is not limited to use with vacuum-cup types of lifting devices, useful and novel as it is therewith. The invention is applicable to any lifting device having the same general problems. The stabilizer system and safety grapple are, for example, just as useful with the electromagnetic lifter 220 illustrated in FIG. 16. There the frame 95 supports the I-beams 133 and safety grapples 121 just as before for pneumatic operation through the cylinders 122. The only substantial change is that a series of electromagnets 221 are supported on the stems 108, instead of the suction cups 110. The electromagnets 221 are spring mounted, as were the cups 110, and indeed the principal difference is the use of magnetic force and direct electrical actuation instead of the electrically controlled solenoid valve 118.

Figures 16, 17:
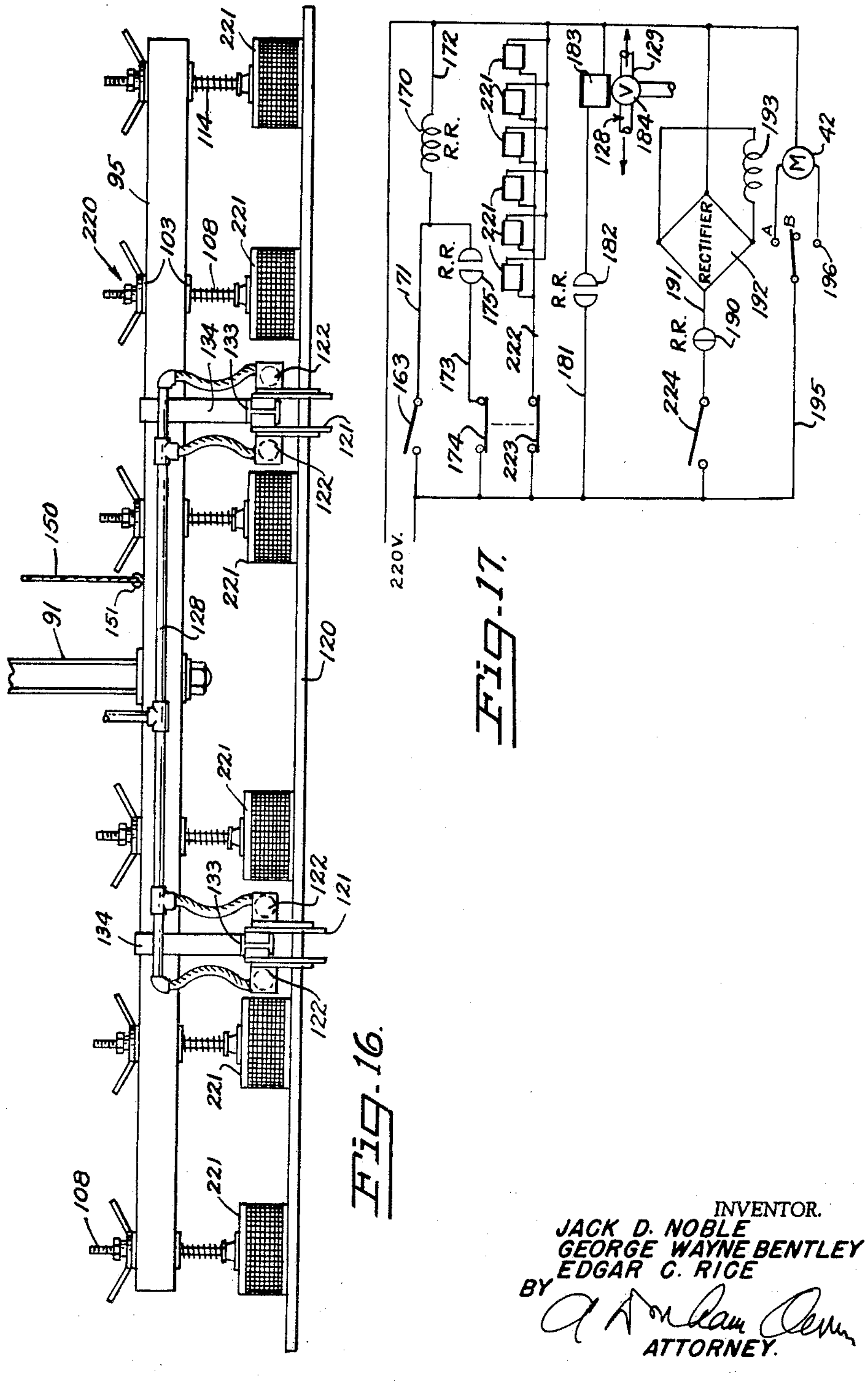
FIG. 16 is a view in front elevation of the lower portion of a modified form of lifting attachment employing electromagnets instead of suction cups. As in FIG. 4, the compressor and some other parts have been omitted for the sake of clarity.
FIG. 17 is a circuit diagram similar to FIG. 13 but adapted to the electromagnet structure of FIG. 16.

Thus the circuit of FIG. 17 is much like the circuit of FIG. 13, and like numerals are used on the bulk of the parts. A new line 222 replaces the line 176, however, and has a normally closed push-button switch 223 mechanically joined with the pushbutton switch 174. The magnets 221 may be in series or in parallel, as shown. A switch 224 replaces the vacuum switch 119. It may be a manual switch or an automatic one, as desired by the user.

When the electromagnets 221 contact the plate 120, the switch 224 is closed, energizing the clutch coil 193 through the relay contacts 190 and rectifier 192. The switch 196 is moved to position A and the motor 42 lifts the hoist 35, winding up the slack in the cable 150, as before. Upon attainment of the predetermined height, the cam 160 closes the switch 163, energizing the relay 170. The contacts 175 and 182 are closed and the contacts 190 are opened, with the same results as before of (1) holding the relay 170 energized, (2) causing the safety grapple to engage the plate 120, (3) de-energizing the clutch 156, and (4) the spring 164 pulling the cam 160 back to its original position. Release is effected (after transportation of the plate 120 to its desired position) by pressing the push-button switches 174 and 223 (one button can be used to open both switches), to de-energize both the relay 170 (so that the hooks 121 are spread apart) and the electromagnets 221.

Of course, the circuit of FIG. 15 is just as readily adapted to the use of electromagnets or other contact lift means.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A lifting attachment for an overhead crane or the like comprising a frame; a plurality of contact lift means supported by said frame; means supported by said frame for activating said contact lift means; a safety grapple for mechanical engagement and support of an object llifted by said contact lift means; means for measuring a predetermined distance of lift of said lifting attachment; and actuation means for first delaying engagement of said grapple until said contact lift means have lifted the object said predetermined distance and then for causing said engagement regardless of the weight of the article being lifted.

2. The lifting attachment of claim 1 wherein said contact lift means comprise vacuum cups and said means for activating comprise means for exerting suction force in said cups.

3. The lifting attachment of claim 1 wherein said contact lift means comprise electromagnets and said means for activating comprises means for applying electric current to said electromagnets.

4. A plate-lifting attachment, comprising: a main frame; a plurality of contact lift means supported by said frame; means supported by said frame for activating said contact lift means; a plurality of cross members supported by said frame; a pair of grapplers movable on each said cross member on opposite sides of said frame; power means for moving said grapplers toward and away from each other; means for measuring a predetermined positive distance of vertical lift of said attachment; and control means actuated by said means for measuring for actuating said power means to move said grapplers normally apart and for actuating said power means independently of the weight of said load and of the rate of vertical movement of said attachment for moving said grapplers toward each other after said contact lift means have lifted a plate a predetermined distance above its original support and for holding said grapplers there until said control means is again actuated to move said grapplers apart.

5. The attachment of claim 4 wherein said contact lift means comprises a plurality of electromagnets in series and said means for activating comprises a normally closed electric circuit including said electromagnets and switch means for opening said circuit.

6. A lifting attachment having a frame; contact lift means supported by said frame; a plurality of cross members supported by said frame; a pair of grapplers on each said cross member, one on each side of said frame, movable along said cross member toward and away from each other; a pneumatic cylinder for each grappler supported by and alongside said cross member, each cylinder having a piston with a rod extending out therefrom and operatively connecting said grappler for movement with said piston; pneumatic means to send air into said cylinder on opposite sides of said piston, one side at a time, to move said piston; and control means for actuating said pneumatic means so as normally to move said grapplers apart and for actuating said pneumatic means for moving said grapplers toward each other after said contact lift means have lifted an object free from a predetermined elevation above its original position.

7. A vacuum plate-lifting attachment for overhead cranes and the like, comprising: a main frame; a plurality of contact lift means spring-mounted on said frame; means supported by said frame for activating said contact lift means; a plurality of cross members supported by a lost-motion connection with said frame; a pair of grapplers on opposite ends of each said cross member and movable therealong toward and away from each other; a pneumatic cylinder for each grappler alongside and parallel to said cross member; a piston in each pneumatic cylinder; a rod extending out therefrom and operatively connected to said grappler so as to move it back and forth on said cross member as said piston moves; pneumatic means to send air into opposite ends of said cylinder on opposite sides of said piston to move said piston; and control means for actuating said pneumatic means to move said grapplers normally apart and for actuating said pneumatic means for moving said grapplers toward each other after said contact lift means have lifted a plate a predetermined distance above its original support and for holding said grapplers there until said control means are actuated to move said grapplers apart.

8. A vacuum lifting attachment for an overhead crane or the like, comprising a frame supporting a plurality of contact lift means and having at least one generally vertical member extending up from said frame, mechanical safety grapple means supported by said frame; and means for actuating said grapple means after said contact lift means and frame have lifted an object a certain distance, comprising a cable having one end connected to said frame and its other end wound around a reel rotatably supported by said vertical member, said reel having means for winding any slack on said cable, a shaft connected to said reel by a normally disengaged clutch, means for engaging said clutch when said contact lift means are energized to lift, so that when a load is lifted said shaft will turn, and means actuated by a portion of said shaft when said shaft has turned a certain amount for disengaging said clutch and returning said shaft to a starting position and for simultaneously causing said safety grapple means to engage the load carried by said contact lift means.

9. A vacuum plate-lifting attachment for overhead cranes and the like, comprising: a main frame; suction cups depending from said frame; a compressor supported by said frame; a first conduit system connecting said compressor to said suction cups; a solenoid valve in said first conduit system for connecting said compressor to exert suction on said cups in a first position of said valve when its solenoid is de-energized and to send air under pressure to said cups in a second position of said valve when its solenoid is energized; a normally open switch having an actuator in said first conduit system that closes said switch upon attainment in said first conduit system of a predetermined degree of vacuum; a plurality of crosswise frame members; a pair of grapplers movable on each crosswise frame member, one on each side of said main frame; a pneumatic cylinder for each grappler alongside it having a piston, a rod extending out therefrom and connected to said grappler, inner and outer ports to send air into opposite ends of said cylinder on opposite sides of said piston, a second conduit system connecting said ports to said compressor, and a second solenoid valve in said conduit system for sending air to all the outer ports when said second solenoid is energized and to all the inner ports when said second solenoid is de-energized; control means for energizing said second solenoid to move said grapplers toward each other only after said normally open switch has closed; and release means for said plate comprising means for de-energizing said second solenoid and energizing said first solenoid.

10. A vacuum plate-lifting attachment for overhead cranes and the like, comprising: a longitudinally extending horizontal main frame; a series of suction cups spring-mounted on said frame; compressor means supported by said frame for exerting suction on said cups; a pair of I-beams crosswise of said frame; a bracket supporting said I-beams on said frame in a lost-motion connection; a pair of trucks on each I-beam, one on each side of said main frame, and having rollers engaging said I-beam for movement therewith; a grappler pivotally supported by each truck and having an upwardly and outwardly sloping plate-engaging face on one end facing said frame and a knurled heel plate on the opposite end that engages said I-beam to prevent relative movement when downward force is applied to said one end; a pneumatic cylinder for each truck alongside, supported by, and parallel to said I-beam and having a piston, a rod extending out therefrom and connected to said truck, inner and outer ports to send air into opposite ends of said cylinder on opposite sides of said piston, a conduit system connecting said ports to said compressor means, and a solenoid valve in said conduit syntem for sending air to all the outer ports in one valve position and to all the inner ports in another valve position; and control means for energizing said solenoid to move said grapplers toward each other only after said suction cups have lifted a plate free from its original support.

11. A vacuum plate-lifting attachment for overhead cranes and the like, comprising: a longitudinally extending horizontal main frame; a series of suction cups depending in a line from said frame, and movable up and down relative thereto; spring means urging said cups normally to a lowered position; a compressor supported by said frame; a first conduit system connecting said compressor to said suction cups; a first solenoid valve in said first conduit system for connecting said compressor to exert suction on said cups in a first position of said valve when its solenoid is de-energized and to send air under pressure to said cups in a second position of said valve when its solenoid is energized; a normally open switch having an actuator in said first conduit system that closes said switch upon attainment in said first conduit system of a predetermined degree of vacuum; a pair of I-beams crosswise of said frame; a bracket supporting said I-beams on said frame in a lost-motion connection; a pair of trucks on each I-beam, one on each side of said main frame, and having rollers engaging said I-beam for movement therewith; a grappler pivotally supported by each truck and having an upwardly and outwardly sloping plate-engaging face on one end facing said frame and a knurled heel plate on the opposite end that engages said I-beam to prevent relative movement when downward force is applied to said one end; a pneumatic cylinder for each truck alongside, supported by, and parallel to said I-beam and having a piston, a rod extending out therefrom and connected to said truck, inner and outer ports to send air into opposite ends of said cylinder on opposite sides of said piston, a second conduit system connecting said ports to said compressor, and a second solenoid valve in said second conduit system for sending air to all the outer ports in one position when its solenoid is energized and to all the inner ports in another position when its solenoid is deenergized; control means for energizing said second solenoid to move said grapplers toward each other only after said suction cups have lifted a plate free from its original support; and release means for de-energizing said second solenoid and energizing said first solenoid.

12. The attachment of claim 11 wherein said control means comprises a member extending above said frame, a cable drum rotatably secured to said member; a cable wound on said drum having an end secured to said main frame; a first shaft secured to said drum for rotation therewith; spring means for rolling up said cable as said cable is slackened, as happens when said frame is lifted by said crane; a second rotatable shaft; an electromagnetic clutch coupling said second shaft to said first shaft when energized and otherwise uncoupling them; a cam mounted on said second shaft; a normally open switch mounted adjacent said second shaft and actuated to a closed position by engagement with a portion of said cam, said switch when closed closing said second solenoid valve and deenergizing said electromagnetic clutch; and spring means for returning said second shaft to a starting position upon the de-energization of said electromagnetic clutch.

13. A lifting attachment for an overhead crane or the like comprising a frame; a plurality of contact lift means supported by said frame; means supported by said frame for activating said contact lift means; a safety grapple for mechanical engagement and support of an object lifted by said contact lift means, comprising a plurality of cross members supported by said frame, a pair of grapplers on each said cross member, one on each side of said frame, movable along said cross member toward and away from each other, and power means for moving said grapplers toward each other at one time and away from each other at another time; and control means for actuating said power means so as normally to move said grapplers apart, for delaying engagement of said grapple until said contact lift means have lifted the object and then for actuating said power means for moving said grapplers toward each other after said contact lift means have lifted an object free from its original position, said control means comprising a vertical member on said frame, a cable having one end secured to said frame and another end secured to a first rotatable member rotatably mounted on said vertical member, means for rotating said first rotatable member to wind up said cable whenever it becomes slackened due to said frame being lifted by a crane or the like, a second rotatable member having a cam mounted thereon, an electrically operated clutch coupling said rotatable members only when energized, a normally open electrical switch mounted adjacent said cam and actuated to a closed position by engagement with a particular portion of said cam, said switch when closed causing said power means to move said grapplers toward each other and de-energizing said clutch, means for returning said second rotatable member to a starting position upon the de-energization of said clutch, and normally open switch means closed upon effective activation of said contact lift means for energizing said clutch, so that when a said crane or the like is then operated to lift said frame, said cam rotates, and at a predetermined distance of lift closes its said switch, causing said grapple to engage said object.

14. A litfing attachment for an overhead crane or the like comprising a frame; a plurality of contact lift means supported by said frame; means supported by said frame for activating said contact lift means; a safety grapple for mechanical engagement and support of an object lifted by said contact lift means, comprising a plurality of cross members supported by said frame, a pair of grapplers on each said cross member, one on each side of said frame, movable along said cross member toward and away from each other, and power means for moving said grapplers toward each other at one time and away from each other at another time; and control means for actuating said power means so as normally to move said grapplers apart and for actuating said power means for moving said grapplers toward each other after said contact lift means have lifted an object free from its original position, first delaying engagement of said grapple until said contact lift means have lifted the object, said control means comprising a yieldable connection between said contact lift means and said frame, so that upon engagement with an object to be lifted said contact lift means move relative to said frame in one direction and upon lifting siad object move in the opposite direction, a normally closed electrical switch mounted on said frame engageable by a portion of said contact lift means and opened when said contact lift means move in said one direction, a normally open switch closed upon activation of said contact lift means and in series with said normally closed switch, and a normally de-energized time-delay relay in series with both said switches and having normally open contacts that, upon a predetermined time delay after energization of said relay, close and cause said power means to move said grapple into engagement with said object.

15. A lifting attachment for an overhead crane or the like comprising a frame; a plurality of vacuum cups supported by said frame; means supported by said frame for exerting a suction force in said cups; a plurality of cross members supported by said frame; a pair of grapplers on each said cross member, one on each side of said frame, movable along said cross member toward and away from each other; a pneumatic cylinder for each grappler supported by and alongside said cross member, each cylinder having a piston with a rod extending out therefrom and operatively connecting said grappler for movement with said piston; pneumatic means to send air into each said cylinder on opposite sides of its said piston, one side at a time, to move said piston, and valve means for actuating said pneumatic means so as normally to move said grapplers apart and for actuating said pneumatic means for moving said grapplers toward each other after said vacuum cups have lifted an object free from its original position; a vertical member on said frame extending upwardly therefrom; a cable drum rotatably secured to said vertical member; a first shaft secured to said drum for rotation therewith; a cable partially wound on said drum and having an end secured to said frame, so that said cable partially unwinds from said drum as said frame is lowered relative to said vertical members; means for winding up said cable on said drum as said cable becomes slackened, as by a said crane or the like lifting said frame; a second rotatable shaft; an electromagnetic clutch coupling said second shaft to said first shaft only when energized; a cam mounted on said second shaft; a normally open switch mounted adjacent said second shaft and actuated to a closed position by engagement with a portion of said cam, said switch when closed moving said valve and causing air to flow into said cylinders to move said grapplers toward each other and de-energizing said electromagnetic clutch, said valve when said switch is open causing air to flow into said cylinders in the opposite sides of said pistons and spreading said grapplers apart; spring means for returning said second shaft to a starting position upon the de-energization of said electromagnetic clutch; and normally open switch means closed upon attainment of a predetermined vacuum in said cups for energizing said electromagnetic clutch, said second shaft rotating when said frame is lifted in direct proportion to the distance of lift, and causing its said cam to rotate so that, at a predetermined distance, its said cam energizes is said switch, causing said grappler to engage said object.

16. A vacuum plate-lifting attachment, comprising: a main frame; a plurality of suction cups supported by said frame; means supported by said frame for applying vacuum to said suction cups; a plurality of cross members supported by said frame; a pair of grapplers movable on each said cross member on opposite sides of said frame; power means for moving said grapplers toward and away from each other; and control means for actuating said power means to move said grapplers normally apart and for actuating said power means for moving said grapplers toward each other after said suction cups have lifted a plate free from its original support and for holding said grapplers there until said control means is again actuated to move said grapplers apart, said control means comprising a member extending up vertically above said frame, a cable drum rotatably secured to said member, a cable wound on said drum and having an end secured to said frame, a first shaft secured to said drum for rotation therewith, spring means for rolling up said cable as said cable is slackened, as happens when said frame is lifted, a second rotatable shaft, an electromagnetic clutch coupling said second shaft to said first shaft when energized and otherwise uncoupling them, a cam mounted on said second shaft, a normally open switch mounted adjacent said second shaft and actuated to a closed position by engagement with a portion of said cam, said switch when closed causing said power means to move said grapplers toward each other and de-energizing said electromagnetic clutch, spring means for returning said second shaft to a starting position upon the de-energization of said electromagnetic clutch, and normally open switch means closed upon attainment of a predetermined vacuum in said cups for energizing said electromagnetic clutch, so that when said frame is lifted, said second shaft rotates in direct proportion to the distance of lift, the cam rotates, and at a predetermined distance the cam energizes its said switch, causing said grapplers to engage said object.

17. A vacuum plate-lifting attachment, comprising: a main frame; a plurality of suction cups supported by said frame; means supported by said frame for applying vacuum to said suction cups; a plurality of cross members supported by said frame; a pair of grapplers movable on each said cross member on opposite sides of said frame; power means for moving said grapplers toward and away from each other; and control means for actuating said power means to move said grapplers normally apart and for actuating said power means for moving said grapplers toward each other after said suction cups have lifted a plate free from its original support and for holding said grapplers there until said control means is again actuated to move said grapplers apart, said control means comprising a yieldable connection between said suction cups and said frame, so that upon engagement with an object to be lifted said cups move relative to said frame in one direction and upon lifting said object move in the opposite direction, a normally closed electrical switch mounted on said frame engageable by a portion of said cups and opened when said cups move in said one direction, a normally open vacuum-operated switch in series with said normally closed switch, and a normally de-energized time-delay relay in series with both said switches and having normally open contacts that, upon a predetermined time delay after energization of said relay, close and cause said power means to move said grapplers into engagement with said object.

18. A lifting attachment for an overhead crane or the like comprising a frame; contact lift means supported by said frame; a safety grappler for mechanical engagement and support of an object lifted by said contact lift means; means for measuring a predetermined positive distance of vertical lift of said attachment; and control means for causing engagement of said grappler after said object has been lifted by said contact lift means a predetermined distance above the beginning of that lift as measured by said means for measuring, whereby said grappler is actuated independently of the weight of the load and of the rate of vertical movement of said attachment.

19. A lifting attachment for an overhead crane or the like comprising a frame; contact lift means supported by said frame; a safety grappler for mechanical engagement and support of an object lifted by said contact lift means; time measuring means for measuring a predetermined time interval; means for actuating said time measuring means to commence measuring said interval at the time when said contact lift means begins to lift said object; and control means actuated by said time measuring means for causing engagement of said grappler after said object has been lifted by said contact lift means after said predetermined time interval beginning when said contact lift means begin to lift said object, so that said grappler is engaged at a specific positive time interval after the lift begins, independently of the weight of the object being lifted and independently of the distance which it is lifted during said time interval.

20. A lifting attachment for an overhead crane or the like, comprising a frame; a plurality of contact lift means supported by said frame; means supported by said frame for activating said contact lift means; a plurality of cross members supported by said frame; a pair of grapplers on each said cross member, one on each side of said frame, movable along said cross member toward and away from each other; power means for moving said grapplers toward each other at one time and away from each other at another time; positive distance measuring means for measuring a predetermined amount of distance of lift of said lifting attachment; and control means actuated by said distance measuring means for actuating said power means so as normally to move said grapplers apart and for actuating said power means for moving said grapplers toward each other after said contact lift means have lifted an object a predetermined distance above from its original position, independently of the weight of said object and independently of the time it takes said lift means to lift the object said predetermined distance.

21. A plate-lifting attachment, comprising: a main frame; a plurality of contact lift means supported by said frame, comprising a plurality of electromagnets in series; means supported by said frame for activating said contact lift means, comprising a normally closed electric circuit including said electromagnets and including switch means for opening said circuit; a plurality of cross members supported by said frame; a pair of grapplers movable on each said cross member on opposite sides of said frame; power means for moving said grapplers toward and away from each other; and control means for actuating said power means to move said grapplers normally apart and for actuating said power means for moving said grapplers toward each other after said contact lift means have lifted a plate free from its original support and for holding said grapplers there until said control means is again actuated to move said grapplers apart, said control means comprising a member extending up from said frame, a cable drum rotatably secured to said member, a cable wound on said drum and having an end secured to said frame, a first shaft secured to said drum for rotation therewith, spring means for rolling up said cable as said cable is slackened, as happens when said frame is lifted, a second rotatable shaft, an electromagnetic clutch coupling said second shaft to said first shaft when energized and otherwise uncoupling them, a cam mounted on said second shaft, a normally open switch mounted adjacent said second shaft and actuated to a closed position by engagement with a portion of said cam, said switch when closed causing said power means to move said grapplers toward each other and de-energizing said electromagnetic clutch, and spring means for returning said second shaft to a starting position upon the de-energization of said electromatic clutch, the normally closed switch, when closed, energizing said electromagnetic clutch, so that when said frame is lifted said second shaft rotates in direct proportion to the distance of lift, the cam rotates, and at a predetermined distance the cam energizes its said switch, causing said grapplers to engage said object.

22. A plate-lifting attachment, comprising: a main frame; a plurality of contact lift means supported by said frame, comprising a plurality of electromagnets in series; means supported by said frame for activating said contact lift means, comprising a normally closed electric circuit including said electromagnets and including switch means for opening said circuit; a plurality of cross members supported by said frame; a pair of grapplers movable on each said cross member on opposite sides of said frame; power means for moving said grapplers toward and away from each other; and control means for actuating said power means to move said grapplers normally apart and for actuating said power means for moving said grapplers toward each other after said contact lift means have lifted a plate a predetermined distance above its original support and for holding said grapplers there until said control means is again actuated to move said grapplers apart, said control means comprising a yieldable connection between said electromagnets and said frame, so that upon engagement with an object to be lifted said electromagnets move relative to said frame in one direction and upon lifting said object move in the opposite direction, a second normally closed electrical switch mounted on said frame engageable by a portion of said electromagnets and opened when said electromagnets move in said one direction, said second normally closed switch being in series with the earlier said normally closed switch, and a normally de-energized time-delay relay in series with both said switches and having normally open contacts that, upon a predetermined time delay after energization of said relay close and cause said power means to move said grapplers into engagement with said object.

23. A lifting attachment for an overhead crane or the like comprising a frame; a plurality of contact lift means supported by said frame; means supported by said frame for activating said contact lift means; a safety grapple for mechanical engagement and support of an object lifted by said contact lift means; and actuation means for first delaying engagement of said grapple until said contact lift means have lifted the object a predetermined distance and then for causing said engagement, said safety grapple and said actuation means comprising a plurality of cross members supported by said frame; a pair of grapplers on each said cross member, one on each side of said frame, movable along said cross member toward and away from each other, a pneumatic cylinder for each grappler supported by and alongside said cross member, each cylinder having a piston with a rod extending out therefrom and operatively connecting said grappler for movement with said piston, pneumatic means to send air into each said cylinder on opposite sides of its said piston, one side at a time, to move said piston, and valve means for actuating said pneumatic means so as normally to move said grapplers apart and for actuating said pneumatic means for moving said grapplers toward each other after said contact lift means have lifted an object free from its original position.

24. The attachment of claim 23 wherein the contact lift means comprises vacuum cups and said means for activating comprises means for exerting a suction force in said cups.

References Cited in the file of this patent

UNITED STATES PATENTS

| | | |
|---|---|---|
| 916,374 | Schnabel | Mar. 23, 1909 |
| 1,957,719 | Naugle | May 8, 1934 |
| 2,390,293 | Colson | Dec. 4, 1945 |
| 2,783,078 | Billner | Feb. 26, 1957 |
| 2,874,990 | Janoff | Feb. 24, 1959 |